(12) United States Patent
Liu et al.

(10) Patent No.: US 8,416,499 B2
(45) Date of Patent: Apr. 9, 2013

(54) PRINTED LENTICULES FOR LENTICULAR PRINTING

(75) Inventors: Chu-Heng Liu, Penfield, NY (US); Beilei Xu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 276 days.

(21) Appl. No.: 12/899,095

(22) Filed: Oct. 6, 2010

(65) Prior Publication Data

US 2012/0087013 A1    Apr. 12, 2012

(51) Int. Cl.
*G02B 27/10* (2006.01)
(52) U.S. Cl. .................. 359/619; 359/620; 359/621
(58) Field of Classification Search ........... 359/619–628
See application file for complete search history.

(56) References Cited

U.S. PATENT DOCUMENTS

| 6,751,024 | B1 | 6/2004 | Rosenthal | |
|---|---|---|---|---|
| 2006/0145374 | A1* | 7/2006 | Baba et al. | 264/1.34 |
| 2007/0188874 | A1* | 8/2007 | Robb et al. | 359/619 |
| 2011/0080472 | A1* | 4/2011 | Gagneraud | 348/51 |
| 2011/0199595 | A1 | 8/2011 | Horn | |

FOREIGN PATENT DOCUMENTS

WO    2006/135776    12/2006

* cited by examiner

*Primary Examiner* — James Jones
(74) *Attorney, Agent, or Firm* — MH2 Technology Law Group LLP

(57) ABSTRACT

Exemplary embodiments provide materials and methods for lenticular printing devices, wherein both a lenticular lens sheet and an interlaced composite image can be formed using an imaging device to provide a precise registration translated from a color-to-color registration.

20 Claims, 3 Drawing Sheets

PRINTED LENTICULES FOR LENTICULAR PRINTING

DETAILED DESCRIPTION

1. Field of the Use

The present teachings relate generally to lenticular printing techniques, and more particularly to materials and methods for lenticular devices.

2. Background

Lenticular printing is a printing technology in which a lenticular lens sheet is used to produce images with the ability to change or produce the illusion of movement as the image is viewed from different angles. In particular, the technology can be used to simulate a morphing from one image to another, a motion clip, or a majority of scenes. The lenticular lens sheet is created with an array of magnifying lenses that magnify different parts of the underlying image. Lenticular printing can be used in advertising, marketing, children's books, novelty items, security documents, and other mediums.

To accomplish the lenticular printing effect, two or more images are divided into equal- or similar-width, narrow image stripes. The created image stripes from the multiple images are combined and interlaced into a single image so that, for example, a first stripe of a first image is disposed first, followed by a first stripe of a second image, followed by a second stripe of the first image, and so on.

The interlaced images are printed directly to a back side of the lens sheet, i.e., by a single-step process or they are printed to a substrate and then laminated to the lens sheet, i.e., by a two-step process, such that individual lenses of the array are disposed over interlaced stripes. Light is reflected off each stripe and refracted through the lenses in different directions, but with light from all stripes of a given image refracted in the same direction. The produced effect is that one full image, or a combination of all the image stripes of an original image, is viewable from a certain angle, and another full image, or a combination of all the image stripes of another original image, is viewable from a different angle. Different effects can be achieved by using more or less stripes per lens and by altering the width and height of the lens.

Problems arise, however, because individual lenses must be precisely aligned with fine stripes of the interlaced images when directly printing interlaced images in the single-step process, or when laminating the lens sheet with the interlaced images in the two-step processes. Alignment problems cause "ghosting" or poor imagery.

Thus, there is a need to overcome these and other problems of the prior art and to provide materials and methods for a more manageable precise registration of lenticular devices.

SUMMARY

According to various embodiments, the present teachings include a method of forming a lenticular device. In the method, a plurality of sets of interlaced stripes can be deposited on a substrate to form an interlaced composite image using an imaging device. Each set of the interlaced stripes can include a first stripe and a second stripe such that the plurality of first stripes corresponds to a first image and the plurality of second stripes corresponds to a second image. To form the lenticular device, a plurality of semi-cylindrical-shaped convex parts can be deposited, using the imaging device, to form a lenticular lens sheet on the interlaced composite image. Each semi-cylindrical-shaped convex part can be aligned with a corresponding set of interlaced stripes of the interlaced composite image.

According to various embodiments, the present teachings also include a method of forming a lenticular device. The device can be formed by first depositing a plurality of sets of interlaced stripes on a spacer material to form an interlaced composite image using an imaging device. Each set of the interlaced stripes can include a first stripe and a second stripe such that the plurality of first stripes corresponds to a first image and the plurality of second stripes corresponds to a second image. A plurality of semi-cylindrical-shaped convex parts can then be deposited, using the imaging device, on a surface of the spacer material opposing the interlaced composite image such that each semi-cylindrical-shaped convex part is aligned with a corresponding set of interlaced stripes of the interlaced composite image.

According to various embodiments, the present teachings further include a lenticular device. The lenticular device can include an interlaced composite image disposed on a substrate, wherein the interlaced composite image can include a plurality of sets of interlaced stripes with each set of the interlaced stripes including a first stripe and a second stripe such that the plurality of first stripes corresponds to a first image and the plurality of second stripes corresponds to a second image. A transparent spacer material can be disposed on the interlaced composite image; and a transparent lenticular structure can be disposed on the transparent spacer material. The transparent lenticular structure can include a plurality of semi-cylindrical-shaped convex parts formed of a material selected from the group consisting of a transparent polymer, a toner material, a solid ink, a UV curable material, and a combination thereof, and each semi-cylindrical-shaped convex part is aligned with a corresponding set of interlaced stripes in a registration manner translated from a color-to-color registration.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Exemplary embodiments provide materials and methods for lenticular printing devices, wherein a lenticular lens sheet and an interlaced composite image can be formed by a same imaging device or same printing engine to provide precise registration there-between. In contrast, conventional lenticular lens sheets are typically pre-manufactured by molding, extrusion, or embossing of plastic sheet materials under heat and pressure. Interlaced images are then printed directly to the conventional lenticular lens sheet or printed to a substrate and then laminated to the lenticular lens sheet.

The imaging process can be performed by an imaging device, for example, a multi-function imaging device including a scanner, printer, copier, fax, and/or other devices used for imaging operations. In embodiments, a printer of the imaging device can be an ink jet printer or a xerographic printer such as a laser printer, and the imaging process can include an inkjet printing process or a xerographic printing process.

Figure 1A:
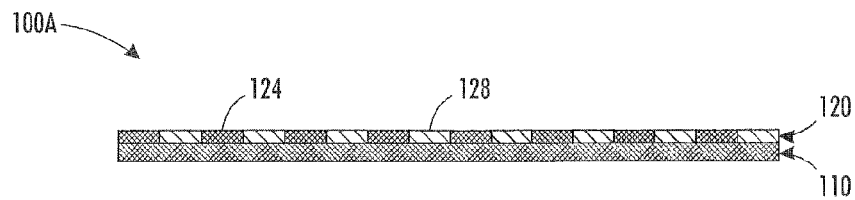
FIGS. 1A-1C depict an exemplary method for forming a lenticular device in accordance with various embodiments of the present teachings.
Figure 1B:
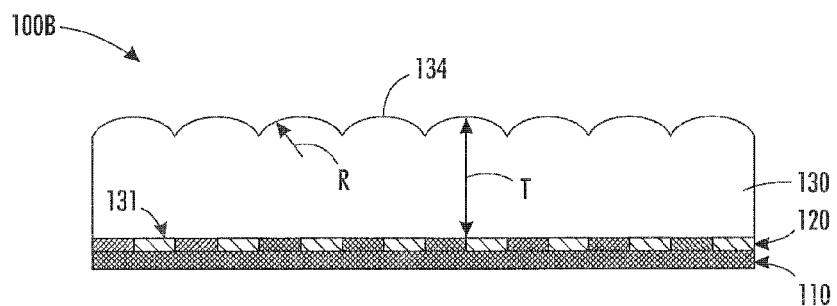
Figure 1C:
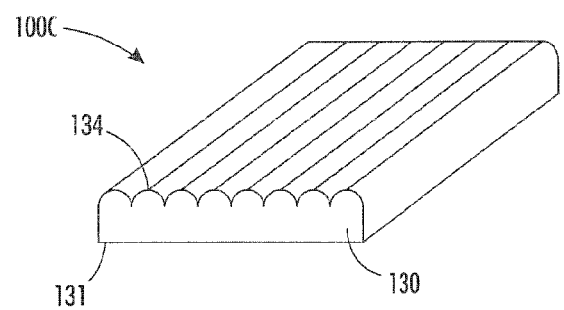

FIGS. 1A-1C depict an exemplary method for forming a lenticular device in accordance with various embodiments of the present teachings.

In FIG. 1A, an interlaced composite image 120 can be deposited or printed on a document or substrate 110, and can include two or more interlaced original images.

As exemplary illustrated, the interlaced composite image 120 can include multiple sets of stripes of, e.g., a first original image 124 and a second original image 128. The stripes of the first original image 124 and the stripes of the second original image 128 can be interlaced such that the stripes from the respective original images 124, 128 alternate. In particular, the first stripe in the composite image 120 can be a stripe from the first original image 124, followed by a stripe from the second original image 128, followed by another stripe from the first original image 124, and so on.

In embodiments, the number of stripes of the first original image 124 and the second original image 128 can vary depending on the size of the original images, the desired length of the interlaced composite image 120, the desired width of the stripes, the size of individual lenticular lenses, and other factors.

The substrate 110 can be, for example, an opaque or transparent substrate. The substrate 110 can be flexible or rigid and can be used as a backing support for the interlaced composite image 120. The substrate 110 can include, but is not limited to, a display screen, a paper sheet, a plastic film, a wall paper, a cardboard, a packaging wrap and etc.

In FIG. 1B, a lenticular lens sheet 130 can be deposited or printed on the interlaced composite image 120. The interlaced composite image 120 can be viewable through the lenticular lens sheet 130.

The lenticular lens sheet 130 can include, for example, a planar lower surface 131 and an upper surface. The planar lower surface 131 can be formed on the interlaced composite image 120, while the upper surface can include a plurality of semi-cylindrical-shaped (or arc-shaped elongated) convex parts 134, serving as lenticular lenses or "lenticules".

In embodiments, the semi-cylindrical-shaped convex parts 134 can be arranged in an array and can be parallel to one another as shown in FIG. 1C. In embodiments, the lenticular lens sheet 130 having the array of semi-cylindrical-shaped convex parts 134 can alternatively have a cross-sectional form of, e.g., aspherical shapes optimized for cylindrical lens imaging.

In embodiments, as shown in FIG. 1B, the shape of lenticular lens sheet 130 can be determined by the lens pitch P, the lens radius R, and the thickness T between the center portion of each semi-cylindrical-shaped convex part 134 and the planar lower surface 131 of the lenticular lens sheet 130. For example, the lenticular lens sheet 130 can have a thickness T ranging from about 0.01 mm to about 4 mm, or from about 0.05 mm to about 3 mm, or from about 1 mm to about 2.5 mm. The lenticular lens sheet 130 can have a lens pitch P ranging from about 5 lpi (lines per inch) to about 400 lpi, or from about 10 lpi (lines per inch) to about 300 lpi, or from about 50 lpi (lines per inch) to about 250 lpi. The lenticular lens sheet 130 can have a lens radius R ranging from about 0.01 mm to about 3 mm, or from about 0.03 mm to about 2 mm, or from about 0.05 mm to about 1.5 mm. The semi-cylindrical-shaped convex parts 134 serving as lenticular lenses can have a focal length equal to the thickness of the lenticular lens sheet 130, although the focal length of the lenticular lenses can be based on other factors.

The lenticular lens sheet 130 can be formed of transparent materials. The transparent materials can include, but are not limited to, a transparent polymer, for example, glycol modified polyethylene terephthalate (PETG), polyvinyl chloride (PVC), or acrylic, a toner resin material (thermal plastic), a solid ink, a UV curable material (e.g., UV curable ink), or other transparent materials as known in the art.

As shown in FIG. 1B, individual semi-cylindrical-shaped convex parts 134 of the lenticular lens sheet 130 serving as lenticular lenses can be suitably and accurately aligned with corresponding sets of interlaced stripes of original images 124 and 128, such that the lenticular lenses can focus incident light onto certain elongated stripes of the interlaced composite image 120 to enable a viewer to view the certain elongated stripes of the composite image in dependence upon viewing angles.

In embodiments, the accurate alignment between the lenticular lens sheet 130 and the interlaced composite image 120 can be obtained by using the same imaging device or the same printing engines such that each semi-cylindrical-shaped convex part 134 and a corresponding set of interlaced stripes of original images 124 and 128 can be aligned in a registration manner, for example, that is translated from color-to-color registration. The color-to-color registration is known to one of ordinary skill in the art. For example, the printing of the interlaced composite image 120 can be considered as the printing of a first color, and the printing of the lenticular lens sheet 130 can be considered as the printing of a second color in the same printing engine. The color-to-color registration can thus be translated to a registration between lenticular lens sheet printing and the interlaced composite image printing.

Following the deposition or printing process, in embodiments, a fixing process can be performed on the deposited transparent materials. The fixing process can include, for example, a fusing, curing, thickening, hardening, and/or drying process depending on the materials used. In some cases, heat, pressure, radiation (e.g., UV light), and/or chemicals can be used during the fixing process when forming the lenticular lens sheet 130 and/or the interlaced composite image 120.

For example, clear toner materials can be printed in dots and/or lines in a xerographic engine. The printed dots/lines can be piled up and can be fused to provide a relief profile shaped as the semi-cylindrical-shaped convex parts 134 in an upper surface of the lenticular lens sheet 130, providing desired optical properties as shown in FIG. 1B.

In another example, solid inks can be printed by jetting clear "ink" dots and/or lines onto the interlaced composite image 120. The natural relief structure of piled dots/lines of the jetted clear ink can be shaped as the semi-cylindrical-shaped convex parts 134 in the upper surface as shown in FIG. 1B, providing desired optical properties.

In an additional example, UV curable inks can be jetted onto the interlaced composite image 120 to form semi-cylindrical-shaped convex parts that are semi-solid, followed by a UV curing process to fix the convex parts. In embodiments, when UV curable material is used, the substrate 110 can be a non-polymeric substance and the UV cured semi-cylindrical-shaped convex parts can provide desirable properties including, e.g., scratch resistant. The UV curing process can use UV light applied at a selected intensity for a selected time period based on the amount of UV cross-linking required to form a UV gel of the semi-cylindrical-shaped convex parts 134 as shown in FIG. 1B.

In embodiments, the steps of deposition (or printing) and fixing of the transparent materials can be repeated in order to provide suitable thicknesses T of the lenticular lens sheet 130. In embodiments, the interlaced composite image 120 and the lenticular lens sheet 130 can be formed using the same or different materials and the same or different processes including, for example, a xerographic printing process or an inkjet printing process.

In this manner, the lenticular lens sheet 130 can be deposited on top of the interlaced composite image 120 with desired registration there-between, which is unlike conventional methods to directly deposit or laminate interlaced composite image onto the lower surface of the lenticular lens sheet.

Figure 2:
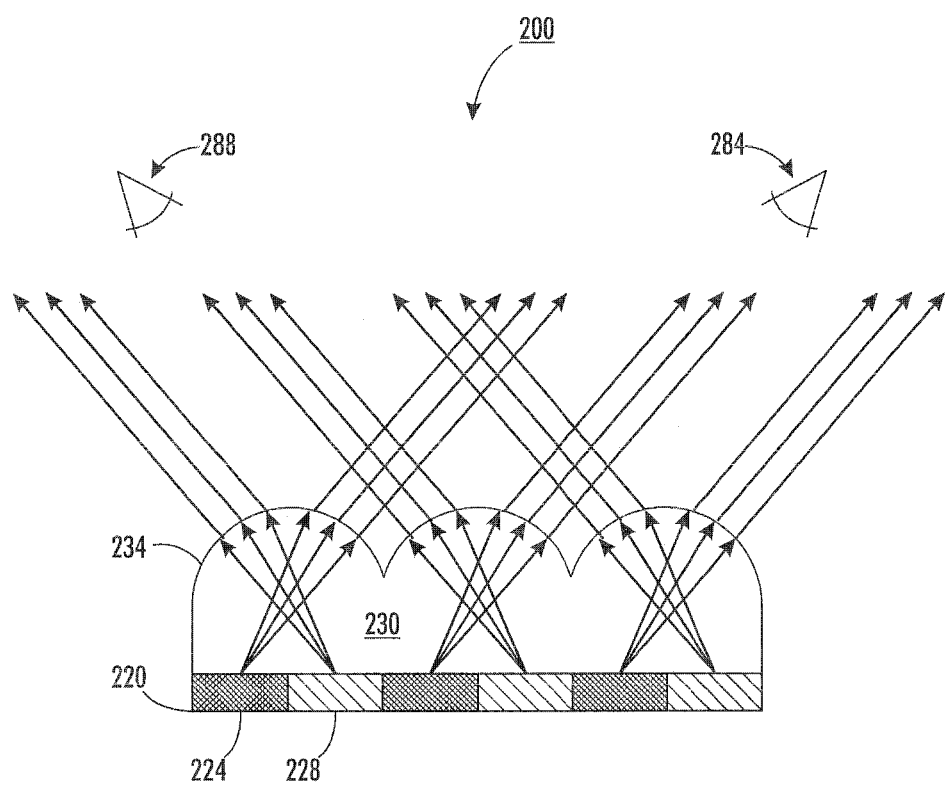
FIG. 2 depicts an exemplary lenticular system in accordance with various embodiments of the present teachings.

FIG. 2 depicts a cross-section of a lenticular system 200 in accordance with various embodiments of the present teachings. The lenticular system 200 includes a composite image plane 220 including stripes of two exemplary images, image A 224 and image B 228, which can be printed on a substrate as described herein. The lenticular system 200 can include a lenticular lens sheet 230 disposed on the stripes of images A and B. The lenticular lens sheet 230 can have an array of lenticular lenses 234 each having a semi-cylindrical-shape. Individual lenticular lenses 234 can have a focal length equal to a thickness of the lenticular lens sheet 230, although the focal length of the lenticular lens can be based on other factors. As exemplarily illustrated, the focal plane of the lens of FIG. 2 is on the composite image 220.

The lenticular system 200 can display different images depending on a viewing angle. For example, the viewing angle of the lenticular system 200 can be the range of angles within which an observer can view the underlying image. Further, the viewing angle of the lenticular system 200 can be determined by the maximum angle at which a light ray can exit a corresponding lenticular lens 234. As shown in FIG. 2, the images A and B can each be viewed at different viewing angles above the lenticular lens sheet 230. In particular, the image A 224 can be viewed at a first viewing angle 284 and the image B 228 can be viewed at a second viewing angle 288. For example, when a viewer is positioned at viewing angles 284 or 288, the viewer can see a magnified version of the individual stripes of the images A or B, which can appear to combine to form the full image. It should be appreciated that the image positioning and viewing angles as depicted in FIG. 2 are merely exemplary and can vary depending on factors such as materials, thicknesses, curvature, and other factors.

The complexity of the interlaced composite image can increase as more original images are included. In cases where there are two original images in the interlaced composite image, the original images can be the same size, and can be either related or unrelated to each other. In cases where there are several original images in the interlaced composite image, a continuity or relatedness among the images can be desired, e.g., to provide an animation-like effect when viewed through a lenticular lens sheet.

Each individual lenticular lens 234 can cover and be accurately aligned with a set of stripes of original images, for example, images A and B. Light reflected off each stripe can be refracted in a slightly different direction, but so that light from all stripes of a respective underlying image is refracted in the same direction. For example, all the stripes corresponding to image A can be viewable from the first viewing angle 284 and all the stripes corresponding to image B can be viewable from the second viewing angle 288. In other words, the complete image A 224 can be viewed by a viewer positioned at the first viewing angle 284 and the complete image B 228 can be viewed by a viewer positioned at the second viewing angle 288.

Figure 3A:
FIGS. 3A-3C depict another exemplary method for forming a lenticular device in accordance with various embodiments of the present teachings.
Figure 3B:
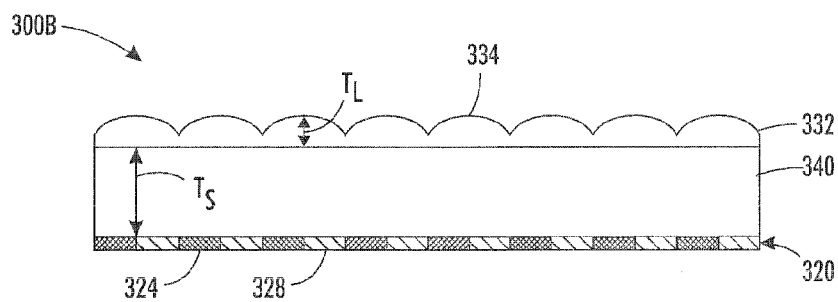
Figure 3C:
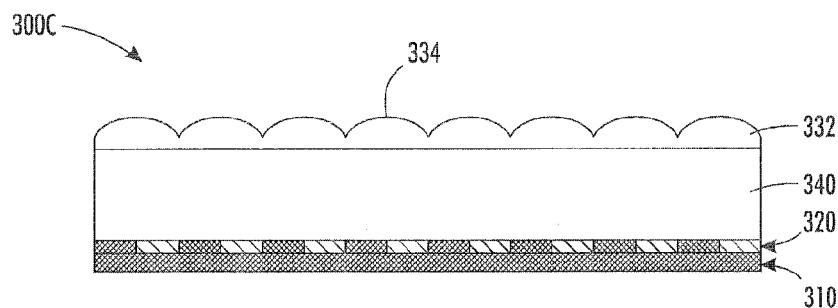

FIGS. 3A-3C depict another exemplary method for forming a lenticular device in accordance with various embodiments of the present teachings.

In FIG. 3A, a spacer material 340 can be provided. The spacer material 340 can be transparent and can include a material of, for example, plexi glasses, or thermo plastics including PVC, polyester, etc. The spacer material 340 can have a thickness $T_s$ ranging from about 0.01 mm to about 4 mm, or from about 0.05 mm to about 3 mm, or from about 1 mm to about 2.5 mm. The spacer material 340 can be formed of the same or different materials as for the lenticular lens sheet 130, 230 of FIGS. 1-2. In embodiments, because the spacer is not made through the printing process as the lenticular structure (see 332), any low cost transparent materials can be used as the spacer material 340.

In FIG. 3B, an interlaced composite image 320 can be deposited or printed on a surface of the spacer material 340 and a lenticular structure 332 can be deposited or printed on an opposite surface of the spacer material 340. The lenticular structure 332 can have a plurality of semi-cylindrical-shaped convex parts 334 serving as lenticular lenses, as similarly described in FIG. 1B and FIG. 2.

In embodiments, the interlaced composite image 320 and the lenticular structure 332 can be deposited or printed simultaneously or sequentially and can be printed within the same printing engines or configurations with precise registration between each semi-cylindrical-shaped convex part 334 (i.e., the lenticular lens) and corresponding stripes of original images 324 and 328. As disclosed herein, such precise registration can be a registration translated from a color-to-color registration by using the same printing engine. In embodiments, the lenticular structure 332 can have a thickness $T_L$ between the center portion of each semi-cylindrical-shaped convex part 334 and the spacer material 340 ranging from about 0.001 mm to about 2 mm, or from about 0.005 mm to about 1 mm, or from about 0.005 mm to about 0.5 mm.

In embodiments, the combination of the spacer material 340 and the lenticular structure 332 can form focal plane of the lenticular lenses (see 334). In embodiments, the combination of the spacer material 340 and the lenticular structure 332 can have same dimensions and functions as the lenticular lens sheet 130 and 230 as in FIGS. 1-2. For example, the semi-cylindrical-shaped convex parts 334 of the lenticular structure 332 can have a lens pitch ranging from 10 lpi (lines per inch) to about 300 lpi.

In embodiments, following the deposition or printing process of the interlaced composite image 320 or the lenticular structure 332, a fixing process including a fusing process, a curing process, a thickening process, a hardening process, and/or a drying process can be performed in combination with, e.g., one or more of heat, pressure, radiation, or chemicals, depending on the materials selected for the interlaced composite image 320 or the lenticular structure 332.

In FIG. 3C, a backing substrate 310 can be attached to, e.g., laminated with, the interlaced image side of the device 300B in FIG. 3B. In embodiments, the backing substrate 310 can be the same or different than the substrate 110 as described in FIGS. 1A-1B. Because a precise registration of the interlaced composite image and the lenticular lenses has already achieved, the attachment of the backing substrate 310 can be conducted offline. In embodiments, due to use of the transparent spacer material 340, less amounts of materials can be used for forming the lenticular lens sheet.

In embodiments, the lenticular devices and systems shown in FIGS. 1-3 can be used for observing any type of images representing, for example, a stereoscopic three dimensional image, an animation, or a selection of different images or displayed information.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising."

Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method of forming a lenticular device comprising:
   depositing a plurality of sets of interlaced stripes on a substrate to form an interlaced composite image using an imaging device; wherein each set of the interlaced stripes comprises a first stripe and a second stripe such that the plurality of first stripes corresponds to a first image and the plurality of second stripes corresponds to a second image; and
   depositing, using the imaging device, a plurality of semi-cylindrical-shaped convex parts to form a lenticular lens sheet on the interlaced composite image, wherein each semi-cylindrical-shaped convex part is aligned with a corresponding set of interlaced stripes of the interlaced composite image.

2. The method of claim 1, wherein the imaging device comprises an inkjet printer or a xerographic printer.

3. The method of claim 1, wherein the lenticular lens sheet is formed from a transparent material selected from the group consisting of a polymer, a toner material, a solid ink, a UV curable material, and a combination thereof.

4. The method of claim 1, wherein the lenticular lens sheet has a thickness T ranging from about 0.05 mm to about 3 mm.

5. The method of claim 1, wherein the plurality of semi-cylindrical-shaped convex parts has a lens pitch ranging from about 10 lpi to about 300 lpi.

6. The method of claim 1, further comprising a fixing process after depositing the plurality of sets of interlaced stripes or after depositing the plurality of semi-cylindrical-shaped convex parts, wherein the fixing process comprises a fusing process, a curing process, a thickening process, a hardening process, a drying process, and a combination thereof.

7. The method of claim 6, wherein the fixing process further uses one or more of heat, pressure, radiation, or chemical.

8. The method of claim 6, further comprising repeating the steps of depositing the plurality of semi-cylindrical-shaped convex parts and the fixing process to provide a thickness of the lenticular lens sheet.

9. The method of claim 1, wherein the substrate is an opaque substrate.

10. A lenticular device formed according to the method of claim 1, wherein each semi-cylindrical-shaped convex part is aligned with the corresponding set of interlaced stripes in a registration manner translated from a color-to-color registration.

11. A method of forming a lenticular device comprising:
    providing a spacer material;
    depositing a plurality of sets of interlaced stripes on the spacer material to form an interlaced composite image using an imaging device; wherein each set of the interlaced stripes comprises a first stripe and a second stripe such that the plurality of first stripes corresponds to a first image and the plurality of second stripes corresponds to a second image; and
    depositing, using the imaging device, a plurality of semi-cylindrical-shaped convex parts on a surface of the spacer material opposing the interlaced composite image, wherein each semi-cylindrical-shaped convex part is aligned with a corresponding set of interlaced stripes of the interlaced composite image.

12. The method of claim 11, wherein the imaging device comprises an inkjet printer or a xerographic printer.

13. The method of claim 11, wherein the spacer material has a thickness $T_s$ ranging from about 0.05 mm to about 3 mm.

14. The method of claim 11, wherein the spacer material is made of a material selected from the group consisting of a plexi glass, a thereto plastic, and a mixture thereof.

15. The method of claim 11, wherein the plurality of semi-cylindrical-shaped convex parts is deposited from a transparent material selected from the group consisting of a transparent polymer, a toner material, a solid ink, a UV curable material, and a combination thereof.

16. The method of claim 11, wherein the plurality of semi-cylindrical-shaped convex parts has a lens pitch ranging from about 10 lpi to about 300 lpi, and a thickness TL between a center portion of each semi-cylindrical-shaped convex part and the spacer material ranging from about 0.005 mm to about 1 mm.

17. The method of claim 11, further comprising a fixing process following the deposition of the plurality of sets of interlaced stripes or following the deposition of the plurality of semi-cylindrical-shaped convex parts, wherein the fixing process comprises a fusing process, a curing process, a thickening process, a hardening process, a drying process, and a combination thereof.

18. The method of claim 17, wherein the fixing process further comprises using one or more of heat, pressure, radiation, or chemical.

19. The method of claim 11, further comprising attaching a substrate to the formed interlaced composite image, wherein the substrate is opaque.

20. A lenticular device comprising:

an interlaced composite image comprising at least one of an ink and a toner disposed on a substrate, wherein the interlaced composite image comprises a plurality of sets of interlaced stripes with each set of the interlaced stripes comprising a first stripe and a second stripe such that the plurality of first stripes corresponds to a first image and the plurality of second stripes corresponds to a second image;

a transparent spacer material disposed on the interlaced composite image; and a transparent lenticular structure disposed on the transparent spacer material, wherein the transparent lenticular structure comprises a plurality of semi-cylindrical-shaped convex parts formed of a material selected from the group consisting of a transparent polymer, a toner material, a solid ink, a UV curable material, and a combination thereof, and wherein each semi-cylindrical-shaped convex part is aligned with a corresponding set of interlaced stripes in a registration manner translated from a color-to-color registration.

* * * * *